460-117 EX

M7843 OR RE 3,550

2 Sheets—Sheet 1.

M. HARDER, G. W. DOUGLASS, H. BECKER & D. ANTHONY.

THRASHING MACHINE.

No. 3,550. Reissued July 13, 1869.

Witnesses
Gilbert. B. Fowks
T. Smith

Inventors
Minard Harder,
Geo. W. Douglass
Hiram Becker,
David Anthony.
by Atty Thos. T. Everett.

M. HARDER, G. W. DOUGLASS, H. BECKER & D. ANTHONY.
THRASHING MACHINE.
No. 3,550. Reissued July 13, 1869.
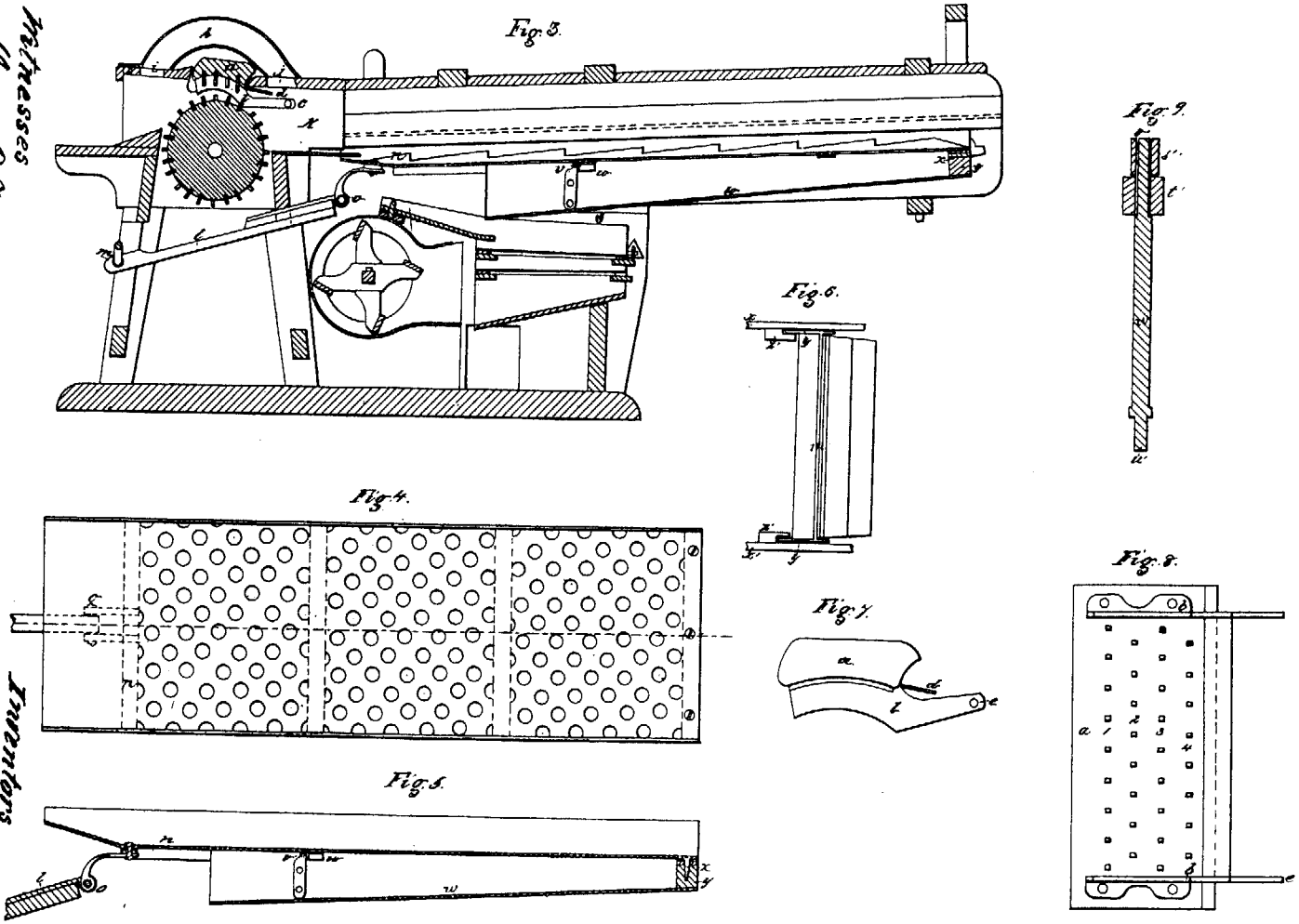
Witnesses
Gilbert P. Fowks
T. Smith
Inventors
Minard Harder
Geo. W. Douglass
Hiram Becker
David Anthony.
by Atty Thos. T. Everett.

United States Patent Office.

REUBEN HARDER AND MINARD HARDER, OF COBLESKILL, NEW YORK, ASSIGNEES OF MINARD HARDER, GEORGE W. DOUGLASS, HIRAM BECKER, AND DAVID ANTHONY.

*Letters Patent No.* 38,862, *dated June* 9, 1863; *reissue No.* 3,550, *dated July* 13, 1869.

DIVISION A.

IMPROVEMENT IN THRESHING-MACHINES.

The Schedule referred to in these Letters Patent and making part of the same.

*To all whom it may concern:*

Be it known that MINARD HARDER, GEORGE W. DOUGLASS, and HIRAM BECKER, of the town of Cobleskill, in the county of Schoharie, and State of New York, and DAVID ANTHONY, of the town of Worcester, in the county of Otsego, and State aforesaid, did invent certain new and useful Improvements in Combined Threshers and Cleaners, for threshing and cleaning grain, &c.; and we do hereby declare that the following is a full, clear, and exact description thereof, reference being had to the accompanying drawings, and to the letters and marks thereon.

This invention relates to that class of machines whereby the grain is threshed and cleaned by one continuous operation; but, like all machines of this character, any one of the several parts of this invention may be used on some other machine for a like purpose, or any one or more of these several parts may be used without the other or the remaining parts, although it is our intention to construct these machines with all the parts of this invention, as herein set forth.

The drawings forming part of this specification show a combined thresher and cleaner having these improvements embraced in its construction—

Figure 1:
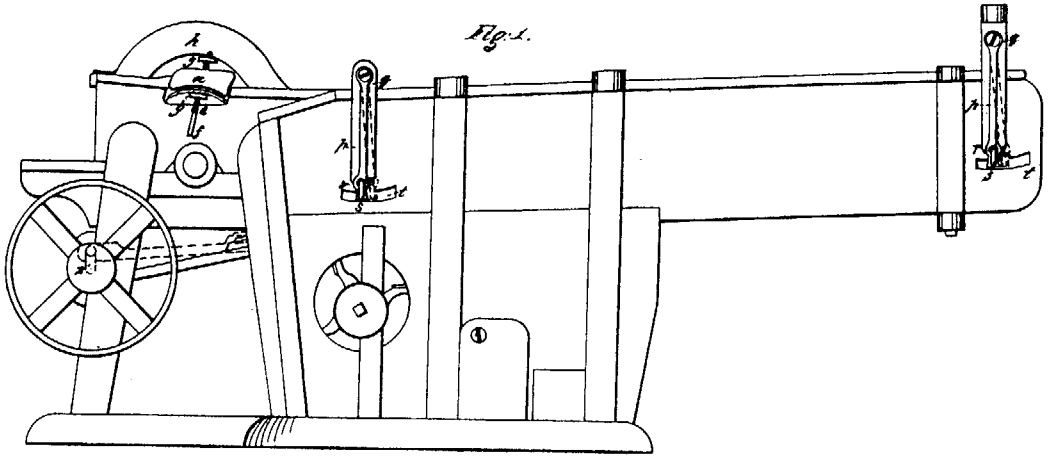
Figure 2:
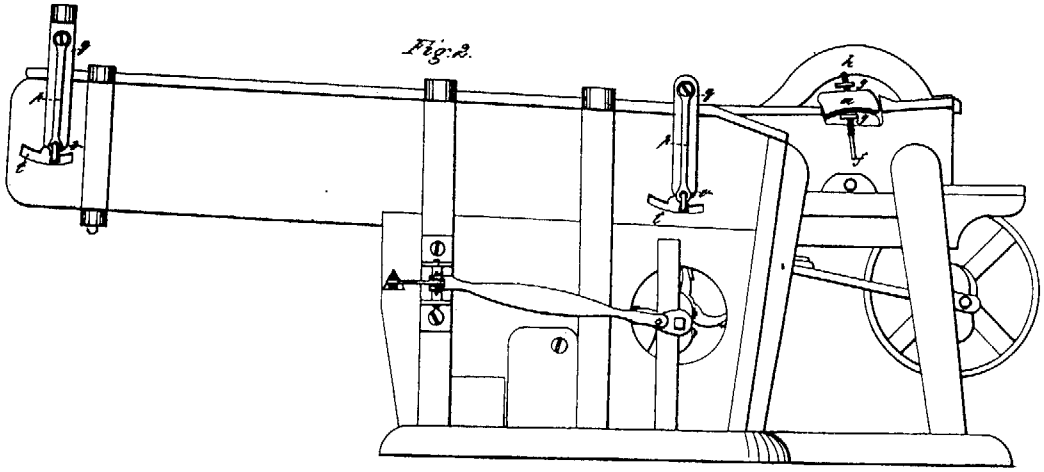

Figures 1 and 2 being side views thereof, the first showing the one side, and the second the opposite side;

Figure 3 being a view by longitudinal section;

Figure 4, a top view of the separator detached from the machine;

Figure 5, a view, by longitudinal section, of the detached separator;

Figure 6, a view, by transverse section, of the separator and the sides of the box or casing thereof;

Figure 7, a view of the "concave," with its suspending-arm detached;

Figure 8, a view of the under or inner surface of the "concave;" and

Figure 9, a view of the cylinder-shaft detached from the machine.

In each of these figures, where like parts are shown, like marks and letters are used to indicate the parts.

The drawings so clearly and fully represent the several and various parts of the machine for threshing and cleaning, that it will be unnecessary to make special description of all the parts of the machine, and, therefore, such description will only be made of the parts or devices of the machine as are more particularly connected with these improvements.

The "concave" *a*, near each of its ends, is connected to arms *b*, which, as will be perceived, extend backward, and are pivoted to the sides of the casing, at *c*, this point *c* being, therefore, that on which the turning or movement is made.

Through each end of the "concave," a rod, *e*, passes, the lower end of which is attached to the side, *f*, of the casing; and from the upper end, to some distance down, the rods *e* have screw-threads, so that, by jam-nuts *g g*, the "concave" may be held at such position on the rods as may be desired.

The advantages arising from having the "concave" thus suspended and controlled, relate to convenience, strength, durability, and economy of power.

When the straw enters the "concave," it, being in its coarse and natural state, requires more space or room than when it has been bruised, pummelled, or softened down, by the action of a portion of the teeth or spikes. By raising the "concave," by the means and in the manner here named, the fore part of the "concave," where the straw enters, is raised more than the rear part, and thus affords a position required by the condition of the straw or grain. Therefore, by this position of the "concave," there is allowed an easier passage of the straw, and, consequently, a greater saving of power, than when both edges of the "concave" are raised alike, or where the front edge, where the straw enters, or either edge, is stationary, or remains in the same place, and all the raising is done at the opposite edge, as is the case in other machines.

The "concave" does not wear out so fast, nor is it so liable to be injured by hard substances getting into it, as when the one edge of the "concave" is more exposed; and the manner of fastening or holding the "concave," at each end, by nuts and rods, as hereinbefore described, is more substantial and durable, holding it more firmly and steadily in the desired place, than if only one fastening is used, and that at or near the centre of the "concave," which is the usual way or place of fastening the same.

It will be seen, that by raising the "concave" in the way here recited, the front row of teeth lengthwise, marked No. 1, is raised a little the most; No. 3, being in corresponding mesh with 1, is raised somewhat less, but not so much as No. 2; No. 4, which is the corresponding row with No. 2, is raised less than either. It will also be seen that the equilibrium or ratio of mesh of the corresponding rows, No. 1 and No. 3, is just equal to that of Nos. 2 and 4, which is ascertained to be of great service in threshing clean.

The pitman or connecting-rod *l*, extending from the crank-shaft *m* to the separator *n*, is attached to the separator by a hinged joint, *o*.

By this manner of connecting the pitman to the separator, there is a saving of power, as it allows the pitman to work free and easy; in other words, to so operate as not to cause any more strain upon the pitman when the crank is in one position than if it were in any other position, thereby requiring less power to run the crank or shaker-shaft. The parts or pieces will all be more durable.

In avoiding or overcoming the strain upon the pitman and crank, we prevent the pitman from tearing loose or breaking at or near the place where it is fastened to the separator. The hole, also, at the other end of the pitman, through which the crank-pin runs, is made more durable, it being liable to wear too large in a short time when there is much strain on the pitman.

The separator *n* is hung or suspended on the rods or hangers *p*, the upper ends of which are pivoted to the uprights *q*, the lower ends having eyes, *r*, into which the ends of the arms or hooks *s*, that are attached to the separator, pass through and fit, holes or curved slots, *t*, being in the sides of the casing, for allowing the necessary movements of the arms or hooks attached to the separator.

By thus hanging or suspending the separator, ease of operation is acquired. It is an efficient and perfect thing for separating grain from straw, for the reason, that in our peculiar way of hanging the separator, when it is on its backward motion, *i. e.*, moving away from the feeder, it runs a little up-hill, thereby giving the straw a toss, shaking the grain out of the straw, allowing the back or discharge-end of the separator to be hung several inches the highest, which prevents the grain from running over, and yet, at the same time, with the tossing motion given to the straw, working it off freely up the plane or elevation. The suspending-rods or hangers, being on the outside, leave more room within for a wider separator, and afford free access, for oiling, repairs, &c. It is a convenient, cheap, and durable way to hang or suspend the separator.

The bottom, *u*, of the separator, is detachable or removable. Hooks *r*, on both of its sides, near its front or lower end, fit into recesses or eyes, *w*, on the under side of the perforated plate of the separator. At its rear end, bolts *x* pass through the perforated plate and the block or bar *y*, which is affixed to the bottom, so that by taking out the bolts *x*, and slightly moving the bottom forward toward the cylinder, the hooks are moved out of the eyes, and the bottom easily detached.

The advantages of a detachable or removable bottom to the separator are, that by taking out the bottom, we are enabled to thresh clover, or any other light seeds, which cannot be done with stationary bottoms, because such light seeds and chaff will not work off the bottom, but will clog and fill up the bottom to the separator, and then compel the seed and chaff to go over the back or discharge-end of the separator with the straw.

Fig. 1, of the drawings, shows, in red lines, a certain position of the crank-arm *z*, and of the suspending-rods or hangers *p*, of the separator, this position of the crank-arm being one of the arrangements of it in relation to the suspending-rods or hangers for a special purpose.

It will be seen that the crank-arm is vertical, and above its shaft, and that the lower ends of the suspending-rods or hangers are back of or to the right of a vertical line. This position of these rods or hangers and the crank-arm is for the purpose of giving the separator a more effective backward movement, and thus enabling it the more readily to work off the straw, and prevent grain from running over the discharge-end of the separator, the first quarter of the revolution of the crank being used for moving the separator up to its highest and most effective point, and to the end of its stroke.

By referring to fig. 6 of the drawings, it will be seen that strips of board, *z'*, are fastened to each wide side-board, *x'*, of the casing, forming a recess for and overlapping the side or side-boards, *y'*, of the separator. These strips prevent grain and straw being driven, from the cylinder, or otherwise, between the side-boards or casing, between which the separator moves or plays, saving grain, and preventing straw from getting between said boards, and impeding the run of the machine; in other words, causing it to run heavy.

Fig. 9 shows the cylinder-shaft *w'*, having the one end, *v'*, extended further from the shoulder, or longer than the other end, *w'*.

The advantage of having the one end longer than the other, is convenience in changing from the right to the left hand, as it is called, and *vice versa; i. e.*, arranging it so as to run from either side of the horse-power.

The long end of the cylinder-shaft allows the putting on of a small pulley, *s'*, on the outside of the large one, *t'*, from which small pulley a belt is run to the fan-shaft, and another belt from the opposite end of the fan-shaft to a pulley, which, by means of a rod or bar and crotch-elbow, connects with the shoe or sieves. These two belts run the fans and sieves.

The main belt from the horse-power, which drives the cylinder, runs on the large pulley.

Now, in order to set the thresher and cleaner on the opposite side of the horse-power, we slip off both the small and large pulleys, then put the larger one on the opposite end, or short end of the shaft, and replace the small one on the long end of the shaft, thereby avoiding the necessity of changing any of the pulleys or connections which run the fans and sieves, and making it the most simple and easily-changed machine from right to left hand, and *vice versa*, before the public.

What is claimed as the invention of the parties herein named, is—

1. The concave, suspended upon the arms *b*, the rods *e*, and jam-nuts *g*, as and for the purposes herein set forth.

2. The hinged joint *o*, for connecting the pitman *l* to the separator *n*, as and for the purposes described.

3. The suspending-rods or hangers *p*, placed outside of the casing, and connected to the separator by the eyes *r*, and arms or hooks *s*, passing through the slots *t*, in combination with the strips *z'* and side-boards *x'*, whereby the separator is moved and guided, as herein described.

4. The hooks *r*, eyes *w*, and bolts *x*, for connecting the bottom, *u*, of and underneath the separator to the separator, so that the bottom, *u*, may be easily and readily detached, as herein recited.

This specification signed, this 8th day of March, 1869.

REUBEN HARDER.
MINARD HARDER.

Witnesses:
GEO. D. HARDER,
C. E. FOOTE.